(12) United States Patent
Cantrell et al.

(10) Patent No.: US 10,621,542 B2
(45) Date of Patent: Apr. 14, 2020

(54) SYSTEM AND METHOD FOR CROWD SOURCE LOANED CODE WITH BLOCKCHAIN

(71) Applicant: Walmart Apollo, LLC, Bentonville, AR (US)

(72) Inventors: Robert Cantrell, Herndon, VA (US); Bruce Wilkinson, Rogers, AR (US); Sid Shake, Rogers, AR (US); David M. Nelms, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/260,576

(22) Filed: Jan. 29, 2019

(65) Prior Publication Data

US 2019/0236542 A1 Aug. 1, 2019

Related U.S. Application Data

(60) Provisional application No. 62/624,746, filed on Jan. 31, 2018.

(51) Int. Cl.
*G06Q 10/08* (2012.01)
*H04L 9/06* (2006.01)
(Continued)

(52) U.S. Cl.
CPC ..... *G06Q 10/0835* (2013.01); *G06Q 10/0832* (2013.01); *H04L 9/0637* (2013.01);
(Continued)

(58) Field of Classification Search
CPC ............ G06Q 10/083; G06Q 10/0832; G06Q 10/0835; H04L 9/0637; H04L 9/0825; H04L 2209/38
(Continued)

(56) References Cited

U.S. PATENT DOCUMENTS 9,426,151 B2 8/2016 Richards et al.
9,436,923 B1 9/2016 Sriram et al.
(Continued)

FOREIGN PATENT DOCUMENTS

WO 2017091685 A1 6/2017

OTHER PUBLICATIONS

Min et. al., "A Permissioned Blockchain Framework for Supporting Instant Transaction and Dynamic Block Size" 2016 IEEE TrustCom/BigDataSE/ISPA (Year: 2016).*
(Continued)

*Primary Examiner* — Kevin H Flynn
*Assistant Examiner* — Emmett K. Walsh
(74) *Attorney, Agent, or Firm* — Venable LLP; Jeffri A. Kaminski

(57) ABSTRACT

Systems, methods, and computer-readable storage media for crowdsource loaned code with blockchain. A method include: initiating, by a customer, a request of crowdsource of a courier for delivering an order when the customer places the order, the request including a delivery time and a delivery address; generating a public key of the customer based at least on the order; specifying the courier by matching the request with information of the courier; obtaining, by the courier, the public key of the customer using blockchain; generating, a one-time private key for the courier based on the order or the request; generating a one-time public key for a store based on the order or the request; presenting, by the courier, the public key of the customer or store, or the one-time private key of the courier at the store; verifying, by the store, the public key of the customer or store, or the one-time private key of the courier; and delivering the order by the courier.

19 Claims, 5 Drawing Sheets

(51) Int. Cl.
  *H04L 9/08* (2006.01)
  *H04L 9/32* (2006.01)
(52) U.S. Cl.
  CPC .......... *H04L 9/0825* (2013.01); *H04L 9/0866* (2013.01); *H04L 9/3239* (2013.01); *H04L 9/3247* (2013.01); *H04L 9/3297* (2013.01); *H04L 2209/38* (2013.01); *H04L 2209/56* (2013.01); *H04L 2209/805* (2013.01); *H04L 2209/84* (2013.01)
(58) Field of Classification Search
  USPC ........................................................ 705/336
  See application file for complete search history.

(56) References Cited

U.S. PATENT DOCUMENTS

| | | | |
|---|---|---|---|
| 2015/0186869 A1* | 7/2015 | Winters | G06Q 20/3255 705/26.81 |
| 2015/0206093 A1 | 7/2015 | Trew et al. | |
| 2015/0227890 A1 | 8/2015 | Bednarek et al. | |
| 2016/0104113 A1 | 4/2016 | Gorlin | |
| 2016/0275461 A1 | 9/2016 | Sprague et al. | |
| 2016/0292672 A1 | 10/2016 | Fay et al. | |
| 2017/0046526 A1 | 2/2017 | Chan et al. | |
| 2017/0048235 A1 | 2/2017 | Lohe et al. | |
| 2017/0091699 A1* | 3/2017 | Mueller | G06Q 10/083 |
| 2017/0116597 A1* | 4/2017 | Bargagli | G06Q 20/36 |
| 2017/0132393 A1 | 5/2017 | Natarajan et al. | |
| 2017/0147975 A1 | 5/2017 | Natarajan et al. | |
| 2018/0096175 A1* | 4/2018 | Schmeling | B29C 64/10 |
| 2018/0097653 A1* | 4/2018 | Zawada | H04L 12/2827 |
| 2018/0107979 A1* | 4/2018 | Westover | G06F 3/0488 |
| 2018/0174097 A1* | 6/2018 | Liu | G06Q 10/0833 |
| 2018/0189753 A1* | 7/2018 | Konda | G06Q 20/065 |
| 2019/0019144 A1* | 1/2019 | Gillen | G06Q 10/0833 |
| 2019/0205884 A1* | 7/2019 | Batra | G06Q 20/4014 |
| 2019/0207762 A1* | 7/2019 | Xie | H04L 63/0823 |

OTHER PUBLICATIONS

Hackius, Niels and Petersen, Moritz, "Blockchain in Logistics and Supply Chain: Trick or Treat?" Published in: Digitalization in Supply Chain Management and Logistics Wolfgang Kersten, Thorsten Blecker and Christian M. Ringle (Eds.) (Year: 2017).*

Ming Li et al., "CrowdBC: A Blockchain-based Decentralized Framework for Crowdsourcing", pp. 1-14.

International Search Report and Written Opinion dated Apr. 15, 2019, issued in corresponding PCT Application No. PCT/US2019/015608.

* cited by examiner

US 10,621,542 B2

SYSTEM AND METHOD FOR CROWD SOURCE LOANED CODE WITH BLOCKCHAIN

BACKGROUND

1. Technical Field

The present disclosure relates to collaborative sharing of database information, and more specifically to systems and methods for crowdsource loaned code with blockchain.

2. Introduction

As the Internet of Things continues to evolve, communications between devices continues to evolve. For example, autonomous cars are being designed to use mesh networks for communications between cars, such that every car is aware of the speed, direction, braking, etc., of the other cars. Drones and unmanned aerial systems (UAS) are being similarly designed, allowing unprecedented coordination. Similarly, parties (e.g., customers, sellers, producers, couriers) within a peer to peer mesh network, can communicate with one another based on smart contracts to save cost and improve efficiency.

However, while the currently available communications between devices or vehicles allow for more informed devices, they do not necessarily improve other aspects of the devices. For example, having more informed devices does not, by itself, provide for collaborative computing, collaboratively storing data in databases, collaboratively sharing battery power, and/or collaboratively sharing digital currency between those informed devices.

SUMMARY

A method for performing concepts disclosed herein can include: initiating, by a customer, a request of crowdsource of a courier for delivering an order when the customer places the order, the request including a delivery time and a delivery address; generating a public key of the customer based at least on the order; specifying the courier by matching the request with information of the courier; obtaining, by the courier, the public key of the customer using blockchain; generating, a one-time private key for the courier based on the order or the request; generating a one-time public key for a store based on the order or the request; presenting, by the courier, the public key of the customer or store, or the one-time private key of the courier at the store; verifying, by the store, the public key of the customer or store, or the one-time private key of the courier; and delivering the order by the courier.

A system configured as disclosed herein can include: a processor; and a computer-readable storage medium having instructions stored which, when executed by the processor, cause the processor to perform operations comprising: initiating, by a customer, a request of crowdsource of a courier for delivering an order when the customer places the order, the request including a delivery time and a delivery address; generating a public key of the customer based at least on the order; specifying the courier by matching the request with information of the courier; obtaining, by the courier, the public key of the customer using blockchain; generating, a one-time private key for the courier based on the order or the request; generating a one-time public key for a store based on the order or the request; presenting, by the courier, the public key of the customer or store, or the one-time private key of the courier at the store; verifying, by the store, the public key of the customer or store, or the one-time private key of the courier; and delivering the order by the courier.

A non-transitory computer-readable storage medium configured as disclosed herein can have instructions stored which, when executed by a computing device, cause the computing device to perform operations which include: initiating, by a customer, a request of crowdsource of a courier for delivering an order when the customer places the order, the request including a delivery time and a delivery address; generating a public key of the customer based at least on the order; specifying the courier by matching the request with information of the courier; obtaining, by the courier, the public key of the customer using blockchain; generating, a one-time private key for the courier based on the order or the request; generating a one-time public key for a store based on the order or the request; presenting, by the courier, the public key of the customer or store, or the one-time private key of the courier at the store; verifying, by the store, the public key of the customer or store, or the one-time private key of the courier; and delivering the order by the courier.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
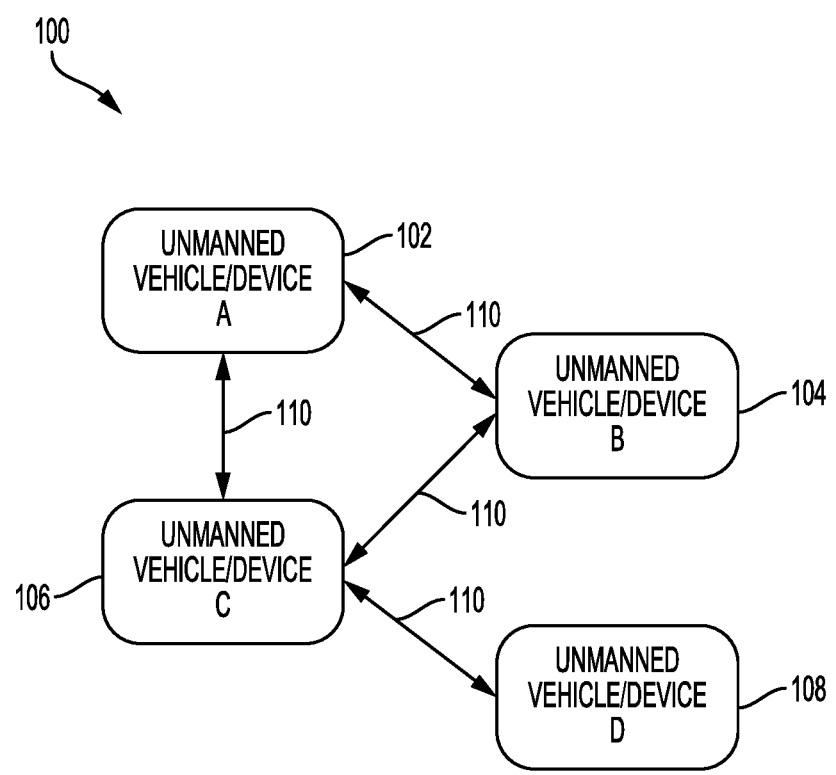
FIG. 1 illustrates an exemplary mesh network between unmanned vehicles/devices.

In this disclosure, methods and systems for crowdsource loaned code based on blockchain are provided. The loaned code may be a one-time exchange of hash keys for approved purchases that would be delivered by a crowdsource provider. A customer may not need to provide the crowdsource provider a credit card or cash, and all parties are assured the value is exchanged. The customer can put a one-time price limit on the purchase corresponding to exactly what they want to order.

In some embodiments, the disclosed system and method may provide a customer with information indicating the correct product was provided by the correct courier. An example system may function as follows.

Crowdsource delivery by a courier may be initiated by the customer when the customer places an order and specifies a courier delivery. The system may allow the customer to view and choose products and their sources using the blockchain ledger for the products.

The customer may have created, via central server and network, an account with a retailer's sales platform by creating a customer profile to store personal information and credentials of the customer in a central database. Each account profile may be configured to store data related to an existing customer, including customer's username, email address, password, phone number, customer's rating, delivery information, delivery (residential) address, payment transaction accounts, purchasing preference, search history, order history, information, other relevant demographic or analytical data, third parties including family members, friends, or neighbors, etc. The delivery information may include courier delivery destination, nearby pickup site information, delivery preference, delivery and pickup timeslots, and other type of information related to delivery.

The system may include a database of couriers. The database may associate the couriers with the preferences of the couriers, for example in a table structure. The table may store the courier's availability, delivery and pick up location preferences, ranking, availability, etc. The system may correlate the delivery task with the database records to identify the available couriers. For these ends, there can be searched only those couriers who are located within a predetermined distance of pick-up and delivery locations. Moreover, couriers can be searched based on other criteria, including historical data, courier ranks, courier rates, courier availability, and so forth. The courier ranking may be based on other factors such as couriers' past performance, couriers' fee schedule, couriers' availability, and so forth. The customer may also specify desired courier ranking, etc. in their order.

The central database may be configured to store a plurality of account profiles. The customer's payment transaction accounts may include one or more blockchain payment transaction accounts associated with blockchain payment networks, one or more credit card or debit card accounts associated with corresponding card payment networks, and one or more mobile payment accounts linked with customer's credit card or debit card accounts.

In one example, the courier may obtain a (public) key from the customer using blockchain. The system can generate a one-time private key for the courier, and a distinct one-time public key for the store. The one-time private key for the courier and the public key for the store may be created by hashing the customer order number, date, time and the customer's private key. As the courier presents the public key of the customer or the hash (one-time private key of the courier and public key of the store) at the store to obtain the order, the store can perform a verification of the customer's public key or the hash. As the order is fulfilled at the store, the system may use scan information of the products to generate a hash. The hash of the picked order may be compared to the hash of the placed order. If a wrong item is picked, the system may not allow the order to complete because the hash of the picked order does not match with the hash of the placed order. In addition, RFID tag information, barcode information or QR code information could be used to create the public and private keys.

Consider the following example. A customer and a store are each part of a system where orders can be placed and confirmed using asymmetrical encryption, with a record of the transaction being added to a blockchain. In this system, the customer and the store are each provided private keys which are known exclusively to them, and which are used to confirm or "sign" the transactions being added to the blockchain. As the customer makes a purchase directly from the store, the customer's private key is algorithmically transformed into a public key which can be verified by either the store or the system. The store can then authorize the transaction by using its private key transformed into a public key. The combination of the public keys can then be combined as part of a hash function, creating a record of the transaction. To obtain data about the transaction from the hash function output, one needs both public keys—that of the customer and that of the store. The private keys of both the customer and store remain secured behind the asymmetrical cryptography of the private key to public key algorithmic transformation.

For the circumstance described by this disclosure, the customer may generate a request for a purchase from the store, then authorizing a courier to perform the transaction. In this case, the public key of the store can remain the same, or a temporary public key can be generated. However, for the courier, a one-time use private key is generated. The one-time use private key for the courier is generated using the customer's private key, as well as information about the product, amount of money authorized, date of order, time of order, or other information about the order. With the one-time use private key generated, the courier can go to the store and present the one-time use private key to the store. In some configurations, because the one-time use private key is encrypted, the courier might not know what products are being acquired at the store. As the courier presents the one-time use private key to the store, the store can "open" the private key and identify what goods, services, or products should be given to the courier. As the transaction is completed, the one-time use private key of the courier can be combined with the public key of the store, as well as data about what goods were given to the courier, then inputted into a hash function. The output of that hash function can then be added to the blockchain as a record of the transaction.

In some configurations, the one-time use private key used by the courier may be mathematically similar to the public keys of the customer and the store, with additional information about the goods (products or services) being requested. That is, the one-time use private key may represent a hashed version of either the private or public keys of the customer, coupled together with data about the transaction, whereas the public keys are hashed versions of the private keys of the customer and/or the store.

In some configurations, the one-time use private key of the courier can be generated using additional data about the courier, such as the name, address, phone number, email, other contact information, bio-metric data (fingerprint, retinal scan, palm scan, facial recognition data, etc.) For example, the private key can be the result of hash function of that additional data.

The store needs to be able to verify the one-time use private key given to the courier as authentic. To do so, the store may have a copy of the one-time use private key sent directly to it via a network, or the store may have access to a computer system which has the one-time use private key stored thereon and which can perform a verification of the private key. However, in some configurations, because the courier's one-time use key is a private key, the data contained therein is not necessarily encrypted or otherwise protected. In such configurations, anyone with access to the data may decipher information contained therein. However, in other configurations, the courier's one-time use private key may be subject to some levels of encryption, such that only those with the cipher ability to easily decrypt the data can decipher the information contained therein.

As described above, the private and public keys may be typical keys (e.g., PKI, AES etc.) Encryption levels and types may vary, for example depending on performance of crypto libraries within that technical stack. The one-time dynamic key is to encrypt attributes that are used at a transaction level, such that the keys are valid only for that relevant transaction. For example, a multi-level encryption may be applied. At level 1 of identity level, a customer, a courier, or another entity has their key pairs in place. At level 2 of transaction level, at time of transaction, a key pair for a service provider using the level 1 keys may be generated for transaction encryption. The level 2 public key is stored "within" the transaction block for future reference and decryption purposes. The level 2 private key is discarded and not stored. At any point, if the customer or the service provider needs to decrypt information, they would need to furnish their level 1 public keys which should successfully generate (again) the transaction private key required to pair up with the public key of that transaction within the blockchain to decrypt the info.

As stated above, the RFID (Radio Frequency Identification), barcode information, or QR code information may be used to create the courier's one-time use private key. Each of these would have a highly specific code which could be used in generating the private key. For example, an RFID on a keychain of the customer may be configured to broadcast a specific pattern on a specific frequency when exposed to a magnetic field. Similarly, a barcode or a QR code represents a specific code which is relatively unique. In one example, the customer would have a barcode on a card which is specifically associated with that customer. The customer would scan the barcode, which would combine the customer's private key with the barcode to generate the one-time use private key for the courier. Similarly, the customer could scan a QR code, or trigger an RFID code, which could then be used to generate the one-time use private key for the courier.

As described herein, a customer may refer to a shopper in a store, a doctor or a maintenance professional, who may seek a device or a part from an organization's supply center. A store may refer to a place of shopping (such as a superstore), or a supply center where a transaction is not necessarily an exchange of money or credit but perhaps a log that a device or part has been drawn and for what purpose or assigned to what initiative or individual. A courier may refer to crowdsource but need not be restricted as such, though the spirit of the invention is to use blockchain for the trust element useful in crowdsource. Embodiments of the invention are described in the context of a customer purchasing goods or services from a service provider. The "customer" and "site" may be any entities engaged in a transaction with each other, and the invention is equally applicable in these scenarios.

In some embodiments, the system may have an underlying smart contract with cryptocurrency or digital currency which can form the basis for the agreement between the customer, courier and store. Only after the delivery is completed is the courier given the key to access the funds stored via the smart contract. The smart contract can include a surety bond requirement from the courier or courier management firm.

Systems, methods, and computer-readable storage media configured according to this disclosure are capable of distributing and sharing code or key information resources among two or more devices or parties. As a device or party determines that it needs additional information (e.g., a public key, customer order information), it sends a request to other devices requesting that those other devices send the device the information needed. This distribution request can, for example, be broadcast through a mesh network between devices, until all the devices within the mesh network, or within a radius of the initial requesting device, have received the request. As devices receive the request, responses to the request are generated and sent back to the requesting device, each response providing an answer as to the ability of each respective device to fulfill the request. The requesting device receives the responses, aggregates and analyzes the responses, and determines how to transition information and resources to a new computing configuration, where the information can be shared, based on the responses. In some cases, this can require transferring information from the requesting device to another device through the mesh network. In addition, this can require modifying computing capacities or configurations at the requesting device as well as other devices within the group of devices. These changes would be broadcast to the group through the mesh network, with any computing resource transitions likewise similarly being broadcast to the group.

As a device in the group begins a computation associated with an assigned task, the device can determine if it needs additional information which is stored by other devices in the group, or accessible by those other devices, and if requesting such information is likely to be desirable. For example, would such distribution of information improve the speed of the computation, the efficiency of the computation, overextend the device performing the computation, provide the information needed in a specified timeframe, etc.

In some configurations, communications between the devices or parties can take the form of a blockchain, where each request and response made by devices can be added to the blockchain ledger. As any device takes an action (sending a request, sending a response to a request), that information is added to the blockchain. More specifically, the request, response, or other action is hashed into the previous blockchain. This new, updated blockchain is then distributed to the other devices within the group.

In other circumstances the devices may be unmanned or autonomous vehicles, drones, robotics, communication devices, or any other electronic device. For example, in one configuration the devices communicating availability may be delivery drones. In another configuration, the devices may be autonomous vehicles or smart home devices. In yet another configuration, the devices may be distinct types of devices, such as a drone and smart home devices communicating, making requests, and generating responses to those requests.

In some embodiments, distributing information resources, or collaborative sharing of information, among the devices can include sharing processor or memory utilization. By implementing the requests and responses, the devices within a group can determine which devices are unused, underutilized, or in use, and will allow the entire group of devices to share the information in a partitioned or redundant manner. In other words, devices in the group can collaborate using distributed intelligence as it relates to their respective memories or databases, and can make decisions on sharing the information based on that information distribution. To do this, each device has a predictive element as part of its operations, whereby each of the devices understands its own peaks and troughs of performance, and can be ready to share their database capacity (both to store and share information) based on that understanding. This can help with registry and shared repository information of devices within the network, failing devices, backup and recovery of information, etc. For example, the group of devices may share a registry redundantly among themselves or on the cloud which would also provide a method of failover from one device to another, or from the cloud. In other words, just because a smart toaster burns up does not mean the data about bread consumption is lost.

The information shared between devices (i.e., on the mesh network) can do so in a peer-to-peer network of devices that is decentralized. That is, all devices have the potential for storing, sharing, and otherwise distributing information needed by any device. This system can be authenticated, shared, and managed, by a block chain system for authentication and decentralization. For instance, if a first device receives a request from an individual, such as order groceries, yet the first device lacks the necessary information to order groceries, the first device can relay an initial block chain of information, as a request, to all other devices in the group. This request can contain the grocery list, time stamp, digital currency information, authentication information, etc. Other devices within the group will receive and authenticate the transmission, then provide information the first device needs to solve the request. This in turn causes an update to the previous block within the blockchain, which will contain the "slave" (second) device's updates with the original "master" initial block (the request). Thus, the necessary information will be accurately shared between the devices, including updates, etc.

The information shared and transmitted between devices (such as requests for assistance, responding to requests for assistance, authentication, and protocol sharing), and the additional database information being requested by a device, can utilize block chain or other authentication methods. Exemplary data which can be stored on a device (and transmitted/received between devices as required) can include a history log, a usage of the device, consumption of power (or other measurement of use), maintenance performed, downtime, consumption of products or other received elements, and/or schedule for future usage.

To share the database information can require moving data, updating or changing processors, modifying memory, or other similar tasks. In one example, a device is scheduled to perform a task but determines it would be faster if additional database information could be provided. One way the device can do this is by planning a shared task configuration, where the first device and another device are configured in a planned manner which enables information sharing, then sending the shared task configuration to other devices to determine availability. If another device can assist, the initiating device could send out a signal to the other device to alter its configuration (i.e., processor or memory) to share the information as instructed by the initiating device. Simultaneously, the initiating device can modify its configuration according to the planned shared task configuration.

Another way the device can share the task is to send a request to other devices inquiring about the availability of the other devices to provide the needed information. Upon receiving the responses to the request, the initiating device can aggregate and analyze the responses, then determine based on the aggregated/analyzed data how to divide the task. This determination would result in a planned shared task configuration, which could be sent to the other devices in the group. The initiating device and the other devices could then modify their respective configurations to match the planned shared task configuration and perform the task of sharing database information.

Various specific embodiments of the disclosure are described in detail below. While specific implementations are described, it should be understood that this is done for illustration purposes only. Other components and configurations may be used without parting from the spirit and scope of the disclosure, and can be implemented in combinations of the variations provided. These variations shall be described herein as the various embodiments are set forth.

FIG. 1 illustrates an exemplary mesh network 100 between unmanned vehicles/devices 102, 104, 106, 108. Those devices may be used by different parties, for example, customers, couriers, and stores. A mesh network such as that illustrated is a network where each node can relay data from and to other nodes within the network. While mesh networks can be constructed to operate in wired conditions, they are more prevalent in wireless configurations, where messages can be broadcast to other nearby nodes (i.e., not sent to a specific node, but rather all nodes within a given distance of the broadcasting node). When a receiving node is located outside the broadcast range of a transmitting node, intermediate nodes may be required to route the transmission to the receiving node. For example, as illustrated, node A 102 can communicate 110 with nodes B 104 and C 106, and nodes B 104 and C 106 can communicate 110 with each other. However, nodes A 102 and B 104 cannot communicate with node D 108. Because node D 108 can only communicate with node C 106, any communications 110 between node A 102 and node D 108, or between node B 104 and node D 108, must route through node C 106.

When requesting and distributing information and resources, the various exemplary devices illustrated in FIG. 1 and discussed above may communicate with one another via a mesh network 100. That is, the devices can transmit, receive, and relay messages between themselves as necessary.

Figure 2:
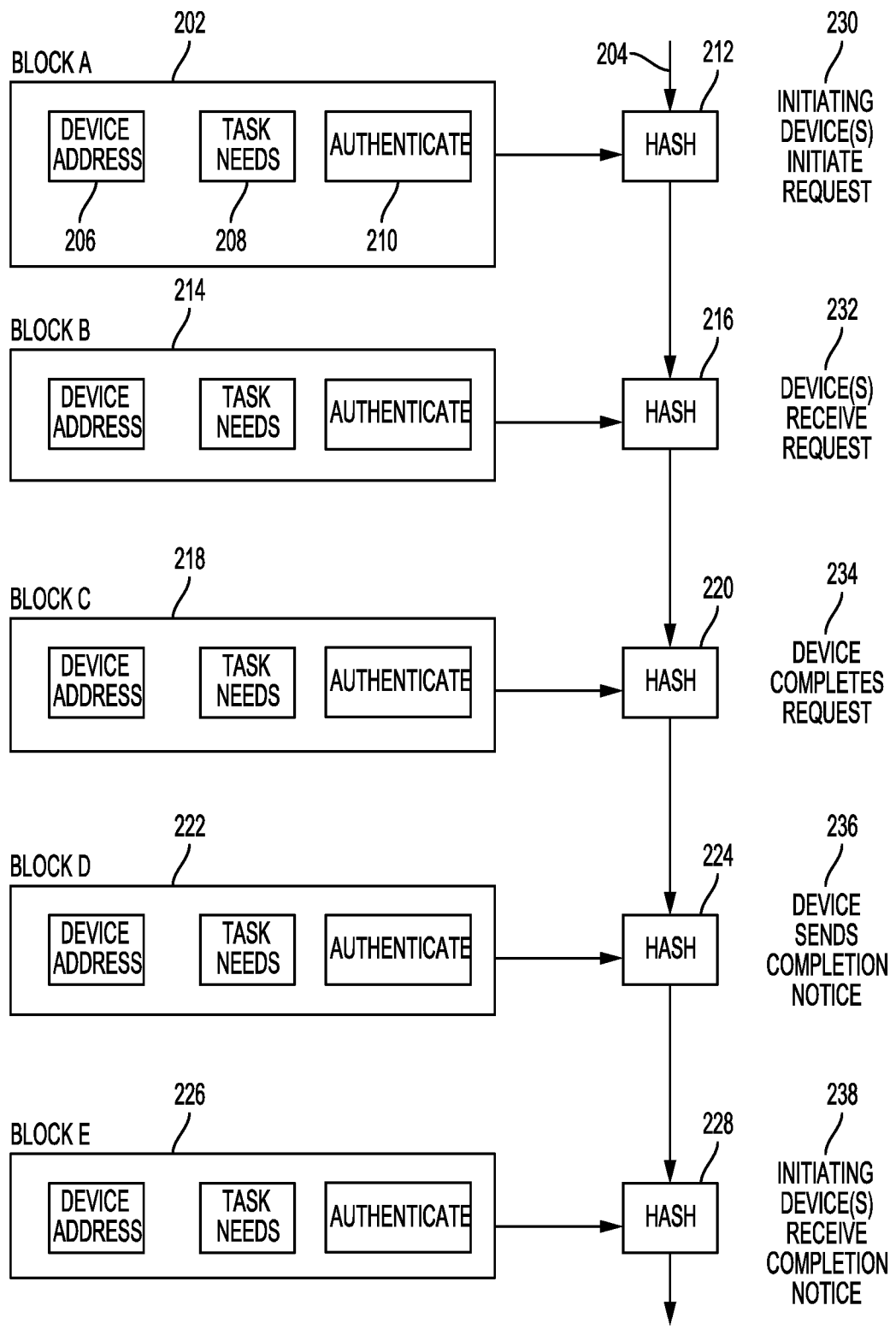
FIG. 2 illustrates an exemplary blockchain based on interactions between devices.

FIG. 2 illustrates an exemplary blockchain based on interactions between devices, for example, the devices in FIG. 1. A blockchain is a distributed digital ledger which is communicated electronically between devices. Each transaction recorded within the digital ledger is a block which can be hashed or otherwise encrypted. As new transactions are added to the digital ledger, each transaction's veracity can be tested against the previous ledger stored by the devices, and can, in some configurations, require confirmation from a defined percentage (usually 50%) of the devices to be added to the blockchain.

In the case of distributing information (e.g, customer order, hash, private and public keys), and reallocating computational tasks among the various devices based on the responses to the requests, the blockchain can take the form illustrated in FIG. 2. In this example, there is a blockchain 204 which has been distributed among multiple devices. One of the devices, an initiating device, determines that distributing the information among other devices would be a better outcome, and proceeds to initiate a request 220. Initiation of the request, in this example, includes generating a block (Block A 202). In this example, each block added to the blockchain contains the device address 206 or identification of the device making the request, responding to the request, or otherwise communicating with the remaining devices in the group of devices. The blocks can contain the task needs 208, which can include the specific request for resources or actions, responses to requests, completion notifications, etc. In addition, the blocks can contain an authentication 210 portion, where the device can approve or authenticate the validity of other transactions and/or provide authority for the present transaction.

As the device generates the block 202 for the initial request, the block 202 is hashed 212 into the previous blockchain 204, resulting in an updated blockchain which is distributed among the devices in the group. The other devices receive the updated blockchain containing the request 232 and generate blocks 214 in response to the request. These responses are hashed 216 into the blockchain. In some scenarios, an additional block could be generated by the initiating device based on the response blocks 214, indicating what action will be taken based on the responses received.

When a device completes the request 234, that device generates a block 218 which is subsequently hashed 220 and added to the blockchain. If a completion notice 236 needs to be generated and sent to the initiating device, the completing device can generate another block 222, which can similarly be hashed 224 and added to the blockchain. Once the initiating device receives the completion notice 238, it may generate a notification indicating the request has been fulfilled, which would similarly require a block 226 to be generated and hashed 228 into the blockchain.

Figure 3:
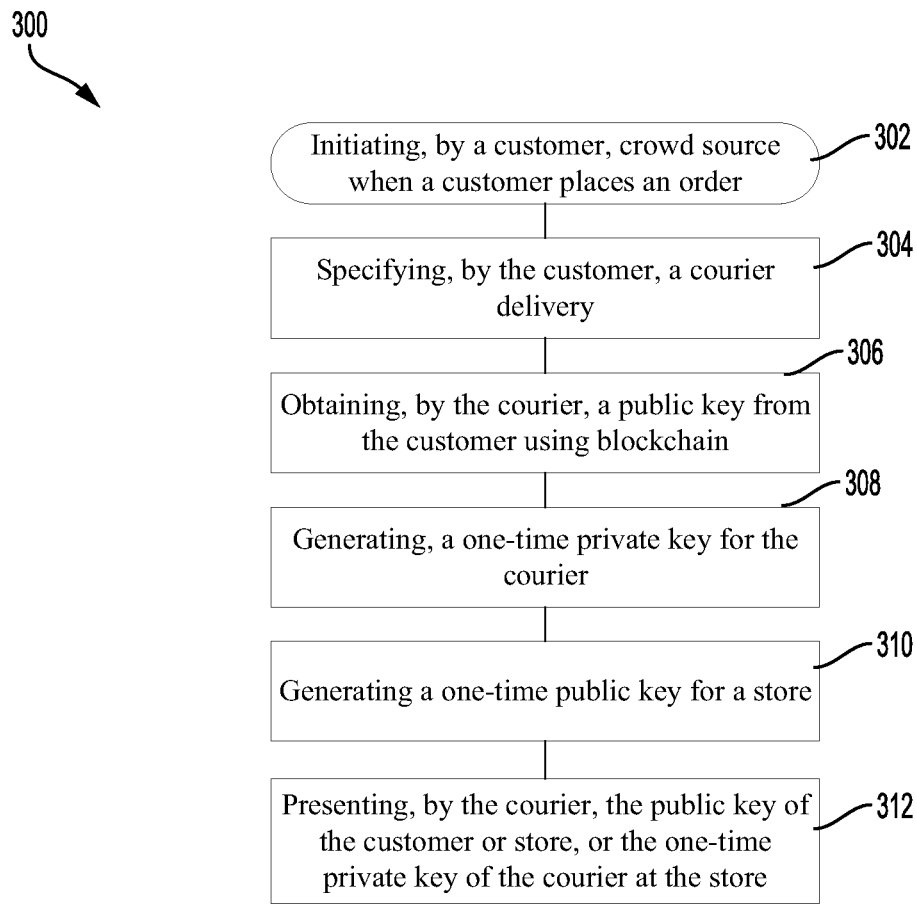
FIG. 3 illustrates an exemplary method of transitioning resources between devices.

FIG. 3 illustrates an exemplary method 300 of transitioning information and resources between devices. The method 300 may be implanted in the system 100 and the blockchain, and may comprise the following steps.

At step 302, crowdsource may be initiated by a customer when the customer places an order. For example, the customer may place the order online, via the device 102, from an online retailer store. Information regarding the order may include customer's username, email address, phone number, customer's rating, payment transaction accounts, ordered product name, product quantity, order date and time, etc. The initiation may comprise specifying delivery information, delivery (residential) address, etc. The information regarding the order may be hashed into a block of the blockchain in FIG. 2. A private key may be generated for the customer, based, at least partially, on hashing the information regarding the order.

At step 304, the customer may specify a courier delivery, by for example referring to a database on which courier's information may be stored. The customer may specify courier ranking, etc. The customer may send out a request of delivering the order to other devices in the network (e.g., FIG. 1). The request may include the information regarding the order. The request may also include courier delivery destination, nearby pickup site information, delivery preference, delivery and pickup timeslots, and other type of information related to delivery. The request may further include courier ranking, courier availability, etc. The request may be hashed into a block of the blockchain in FIG. 2.

In some embodiments, the system may correlate the request with the database records of couriers to identify an available courier. The database may store the courier's availability, delivery and pick up location preferences, ranking, availability, etc. The correlation between the customer's delivery request and the database records of couriers may be based on that the database records of couriers match the customer's request completely, or the database records of couriers match the customer's request as many as possible that may meet a threshold, if not possible to match all.

In some embodiments, a courier associated with the network may respond to the delivery quest sent by the customer, if the courier can meet the requirements included in the request.

At step 306, the courier may obtain a (public) key of the customer using blockchain. Once the courier is specified in the step 304, the courier may be assigned a public key of the customer. The public key of the customer is associated with the private key of the customer. Specifically, the customer's private key is algorithmically transformed into the public key which can be verified by either the store or the system. The public key of the customer may be hashed into a block of the blockchain in FIG. 2.

At step 308, a one-time private key for the courier and a one-time public key for the store may be generated. The one-time private key for the courier and the public key for the store may be created by hashing information about the order, such as the customer order number, date, time and the customer's private key. The one-time private key for the courier and the public key for the store may be hashed into a block of the blockchain.

In some configurations, the one-time use private key used by the courier may be mathematically similar to the public keys of the customer and the store, with additional information about the goods (products or services) being requested. That is, the one-time use private key may represent a hashed version of either the private or public keys of the customer, coupled together with data about the transaction, whereas the public keys are hashed versions of the private keys of the customer or the store.

In some configurations, the one-time use private key of the courier can be generated using data about the courier, such as the name, address, phone number, email, other contact information, bio-metric data (fingerprint, retinal scan, palm scan, facial recognition data, etc.) For example, the private key can be the result of hash function of that additional data.

The store should be able to verify the one-time use private key given to the courier as authentic. To do so, the store may have a copy of the one-time use private key sent to it via the network in FIG. 1, or the store may have access to a computer system which has the one-time use private key stored thereon and which can perform a verification of the private key. However, in some configurations, because the courier's one-time use key is a "private key," the data contained therein is not necessarily encrypted or otherwise protected. In such configurations, anyone with access to the data may decipher information contained therein. However, in other configurations, the courier's one-time use private key may be subject to some levels of encryption, such that only those with the ability to decrypt the data can decipher the information contained therein.

At step 310, the courier may present the public key of the customer and store or the hash (one-time private key of the courier and public key of the store) at the store. As the courier presents the public key of the customer or the hash (one-time private key of the courier and public key of the store) at the store to obtain the order, the store can perform a verification of the customer's public key or the hash. The verification may be performed as follows. For example, as the order is fulfilled at the store and the order is scanned, the system may use the scanned information of the products to generate a hash. The scanned information of the products may include product name, product quantity, order date, order time, customer name, customer payment, etc. such hash may then be compared to the hash presented by the carrier. If a wrong item is picked, the system may not allow the order to complete because the hash of the fulfilled order (i.e., the hash generated from the scanned information) does not match with the hash presented by the carrier (i.e., the hash generated when the order was placed.). In addition, RFID tag information, barcode information or QR code information could be used to create the public and private keys.

In some embodiments, the system may have an underlying smart contract with digital currency which can form the basis for the agreement between the customer, courier and store. The smart contract can include a surety bond requirement from the courier or courier management firm.

Figure 4:
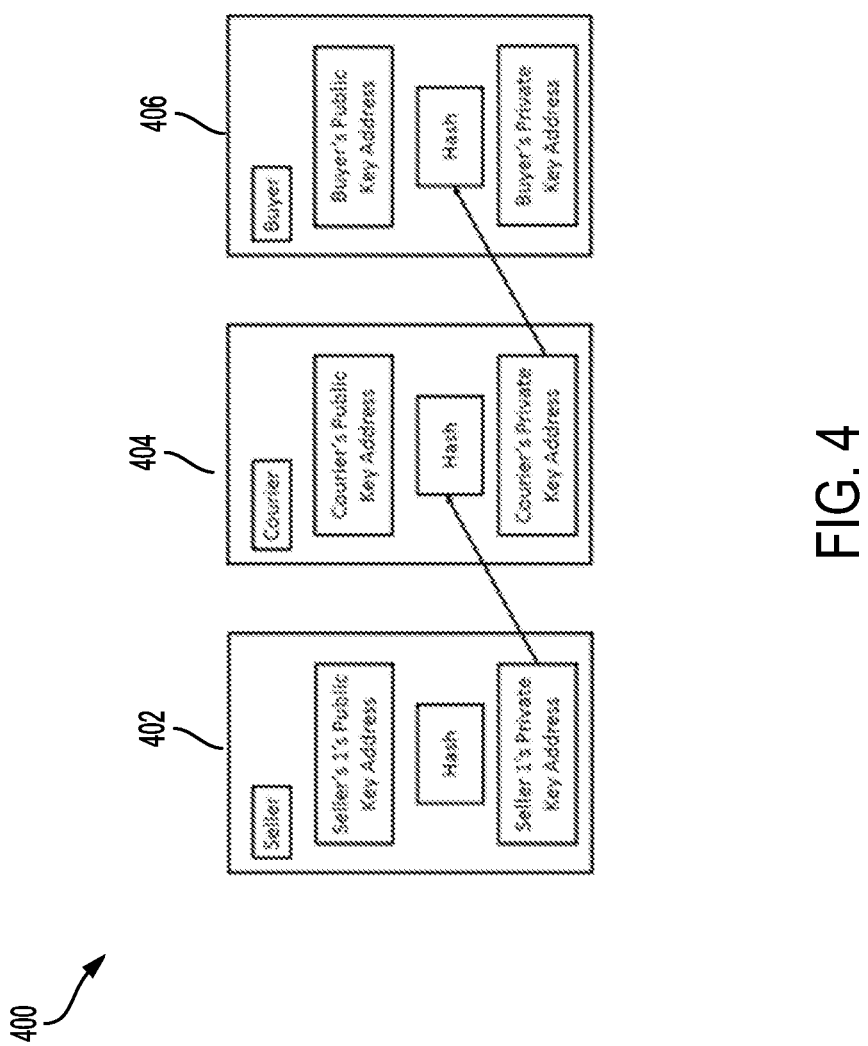
FIG. 4 illustrates an exemplary block diagram.

FIG. 4 illustrates an example blockchain, in according to one embodiment. In block 402, information of a seller (e.g., an online retailer store) is contained. The information of the seller may comprise public key address of the seller, a hash generated from a block prior to the block 402, and private key address of the seller. In block 404, information of a courier is contained. The information of the courier may comprise public key address of the courier, a hashed generated based on the private key address of the seller in block 402, and private key address of the courier. In block 406, information of a buyer (e.g., a customer who shops from the seller and specifies the courier for delivering) is contained. The information of the buyer may comprise public key address of the buyer, a hashed generated based on the private key address of the courier in block 404, and private key address of the buyer.

Figure 5:
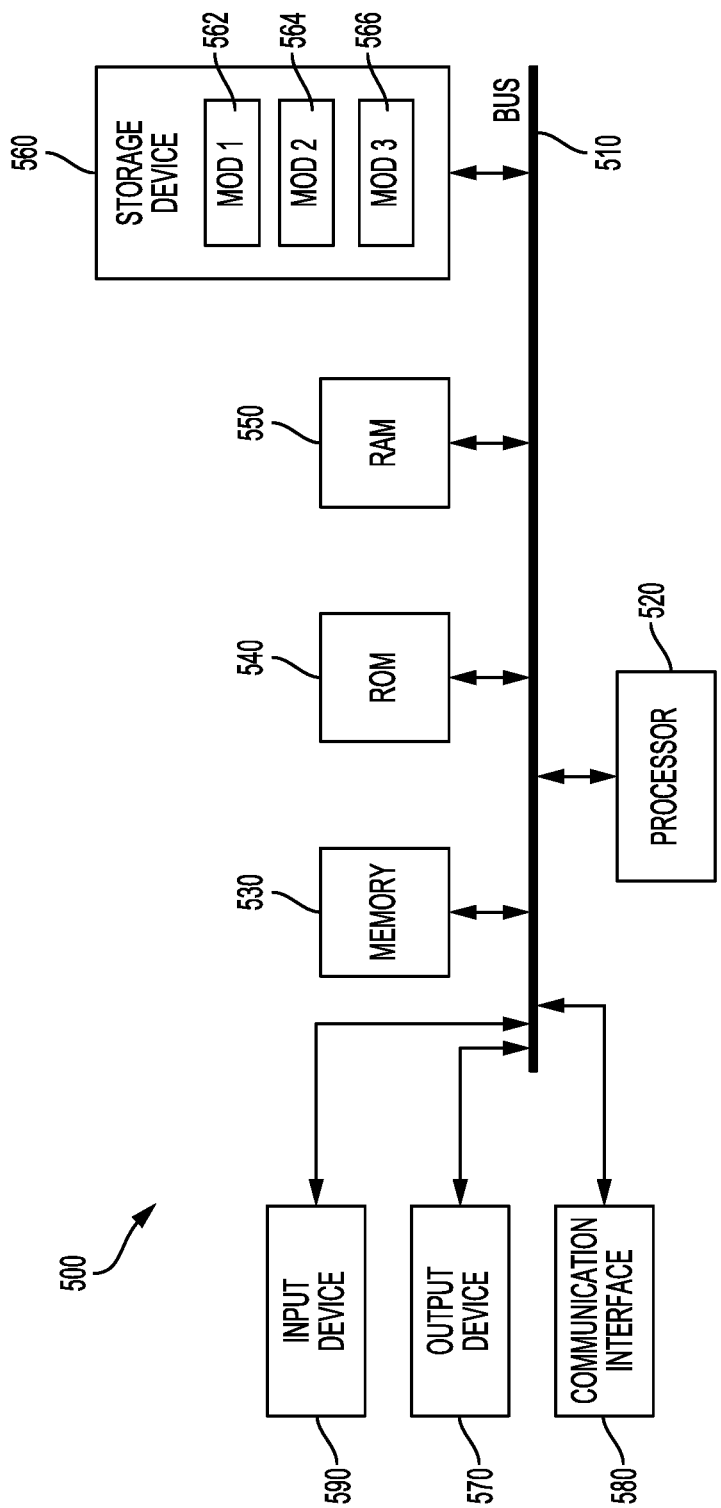
FIG. 5 illustrates an exemplary computer system.

With reference to FIG. 5, an exemplary system 500 can include a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   initiating, by a customer, a request of crowdsource of a courier for delivering an order when the customer places the order, the request including a delivery time and a delivery address;
   generating, by one more processors, a private block of a blockchain based on hashing at least the order;
   generating, by the one more processors, a private key of the customer based at least on the private block;
   specifying, by the one more processors, the courier by matching the request with information of the courier;
   generating, by the one more processors, a public key of the customer based at least on transforming the private key of the customer;
   generating, by the one more processors, a public block of the blockchain based on hashing the public key of the customer;
   obtaining, by the courier, the public key of the customer from the blockchain;

generating, by the one or more processors, a one-time private key of the courier based on the order or the request;
hashing, by the one more processors, the one-time private key of the courier into the blockchain;
generating, by the one more processors, a one-time public key of a store based on the order or the request;
hashing, by the one more processors, the one-time public key of the store into the blockchain;
presenting, by the courier, the public key of the customer or store, or the one-time private key of the courier at the store;
verifying, by the store, the public key of the customer or store, or the one-time private key of the courier; and
delivering the order by the courier.

2. The method of claim 1, further comprising:
specifying, by the customer, a courier ranking.

3. The method of claim 1, further comprising:
generating the one-time private key of the courier by hashing the customer order number, date, time and the customer's private key of the customer.

4. The method of claim 1, further comprising:
generating the one-time public key of the store by hashing the customer order number, date, time and the customer's private key.

5. The method of claim 1, further comprising:
allowing the customer to view and choose products and their sources using the blockchain ledger for the products.

6. The method of claim 1, further comprising:
generating a hash using the scan information of the product.

7. The method of claim 6, wherein RFID tag information, barcode information or QR code information are used to create the hash.

8. The method of claim 1, further comprising:
forming an agreement between the customer, courier and store based on an underlying smart contract with cryptocurrency currency.

9. The method of claim 8, wherein the smart contract includes a surety bond requirement from the courier or courier management entity.

10. A system, comprising:
a processor; and
a computer-readable storage medium having instructions stored which, when executed by the processor, cause the processor to perform operations comprising:
generating a private block of a blockchain based on hashing at least the order;
generating a private key of the customer based at least on the private block;
specifying the courier by matching the request with information of the courier;
generating a public key of the customer based at least on transforming the private key of the customer;
generating a public block of the blockchain based on hashing the public key of the customer;
obtaining, by the courier, the public key of the customer from the blockchain;
generating, a one-time private key of the courier based on the order or the request;
hashing the one-time private key of the courier into the blockchain;
generating a one-time public key of a store based on the order or the request;
hashing the one-time public key of the store into the blockchain;
presenting, by the courier, the public key of the customer or store, or the one-time private key of the courier at the store;
verifying, by the store, the public key of the customer or store, or the one-time private key of the courier; and
delivering the order by the courier.

11. The system of claim 10, the computer-readable storage medium having additional instruction stored which, when executed by the processor, cause the processor to perform operations comprising:
specifying, by the customer, a courier ranking.

12. The system of claim 10, the computer-readable storage medium having additional instruction stored which, when executed by the processor, cause the processor to perform operations comprising:
generating the one-time private key of the courier by hashing the customer order number, date, time and the customer's private key.

13. The system of claim 10, the computer-readable storage medium having additional instruction stored which, when executed by the processor, cause the processor to perform operations comprising:
generating the one-time public key of the store by hashing the customer order number, date, time and the private key of the customer.

14. The system of claim 10, the computer-readable storage medium having additional instruction stored which, when executed by the processor, cause the processor to perform operations comprising:
allowing the customer to view and choose products and their sources using the blockchain ledger for the products.

15. The system of claim 10, the computer-readable storage medium having additional instruction stored which, when executed by the processor, cause the processor to perform operations comprising:
generating a hash using the scan information of products.

16. The system of in claim 15, wherein RFID tag information, barcode information or QR code information are used to create the hash.

17. The system of claim 10, the computer-readable storage medium having additional instruction stored which, when executed by the processor, cause the processor to perform operations comprising:
forming an agreement between the customer, courier and store based on an underlying smart contract with cryptocurrency currency.

18. The system of in claim 17, wherein the smart contract includes a surety bond requirement from the courier or courier management firm.

19. A non-transitory computer-readable storage medium having instructions stored which, when executed by a computing device, cause the computing device to perform operations comprising:
generating a private block of a blockchain based on hashing at least the order;
generating a private key of the customer based at least on the private block;
specifying the courier by matching the request with information of the courier;
generating a public key of the customer based at least on transforming the private key of the customer;
generating a public block of the blockchain based on hashing the public key of the customer;
obtaining, by the courier, the public key of the customer from the blockchain;

generating, a one-time private key of the courier based on the order or the request;
hashing the one-time private key of the courier into the blockchain;
generating a one-time public key of a store based on the order or the request;
hashing the one-time public key of the store into the blockchain;
presenting, by the courier, the public key of the customer or store, or the one-time private key of the courier at the store;
verifying, by the store, the public key of the customer or store, or the one-time private key of the courier; and
delivering the order by the courier.

\* \* \* \* \*